United States Patent

[11] 3,588,640

[72] Inventor Hohn H. Fabricius
 Stamford, Vt.
[21] Appl. No. 880,529
[22] Filed Nov. 28, 1969
[45] Patented June 28, 1971
[73] Assignee Sprague Electric Company
 North Adams, Mass.

[54] HIGH CAPACITANCE VARIABLE CAPACITOR
 10 Claims, 7 Drawing Figs.
[52] U.S. Cl. .................................................. 317/249,
 317/249R
[51] Int. Cl. .................................................. H01g 5/08
[50] Field of Search .......................................... 317/249,
 249 (D)

[56] References Cited
UNITED STATES PATENTS
2,789,259 4/1957 Eisler .......................... 317/249
2,790,970 4/1957 Kodama ..................... 317/249X Primary Examiner—E. A. Goldberg
Attorneys—Connolly and Hutz, Vincent H. Sweeney, James Paul O'Sullivan and David R. Thornton ABSTRACT: In a laminated structure, one electrode is disposed on a thin ceramic dielectric member in overlying relation to a lower electrode, and includes a plurality of spaced conductive island areas which are capable of being interconnected in parallel by a movable flexible wiper that provides electrical connection between the islands and an adjacent terminal of the capacitor.

PATENTED JUN28 1971 3,588,640
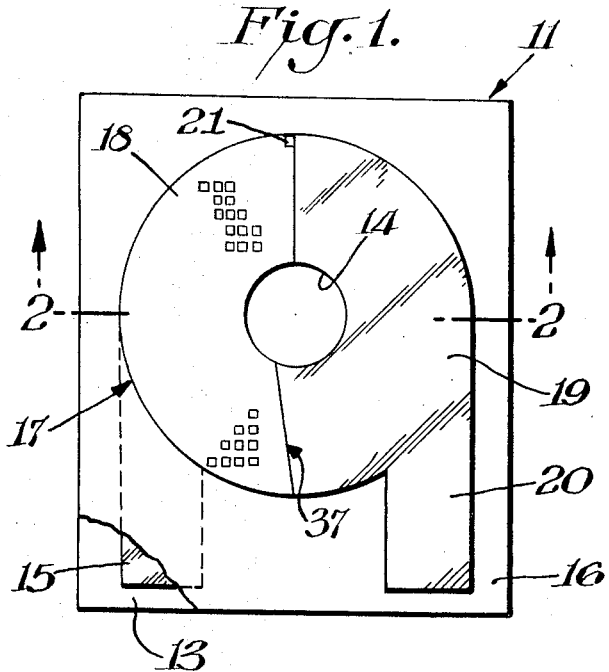
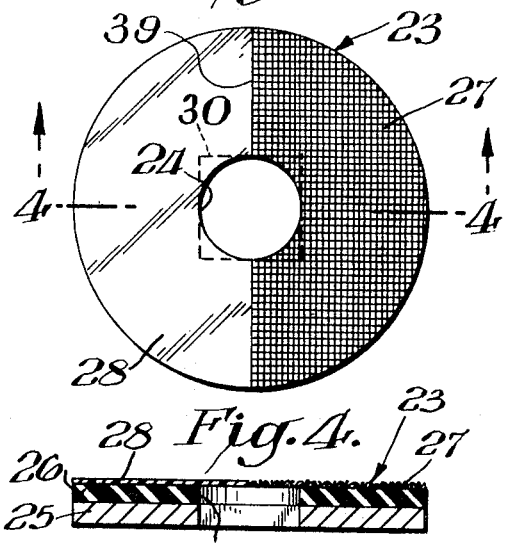
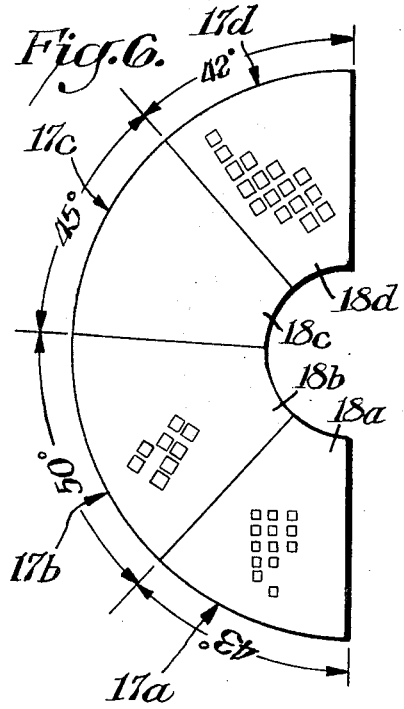
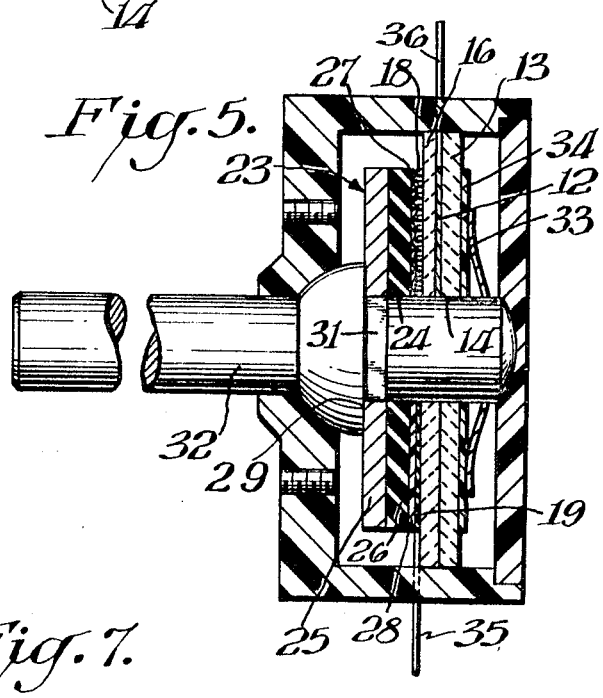
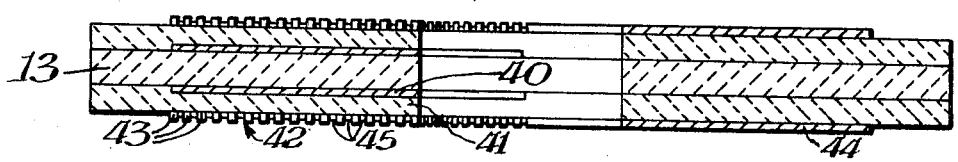

HIGH CAPACITANCE VARIABLE CAPACITOR

BACKGROUND OF THE INVENTION

This invention relates to high capacitance variable capacitors, and more particularly to a high capacitance variable ceramic capacitor having enhanced stability.

The prior art impediment, to reaching stable higher capacitance values in variable ceramic capacitors has been the heretofore unavoidable presence of a low dielectric constant medium in the form of an interface between the movable electrode and the ceramic dielectric. This gap, whether it be air or liquid, has a much lower dielectric constant than the ceramic dielectric body material separating the capacitor electrodes and thereby constitutes an undesirable capacitance in series with the body capacitance.

An object of this invention is the provision of a variable capacitor in which the interface gap is eliminated.

Another object is the provision of a variable capacitor having high capacitance with a high degree of stability.

Still another object is to provide a laminated monolithic capacitance member of variable capacitance.

A further object is to provide a movable contact of large surface area having a plurality of interconnected contact areas capable of providing substantially independent and uniform contact pressure to adjacent points over a wide area.

SUMMARY OF THE INVENTION

In accordance with this invention a high capacitance variable capacitor employs a layered structure having a pair of fixed electrodes separated by a thin dielectric film, and a contact for providing connection between isolated areas of one electrode and a terminal thereof.

In general, the variable high capacitance capacitor of this invention has both electrodes and their output terminals arranged in a laminated member with circuit contact to isolated areas of an exposed surface electrode being made through another member which provides a bridging connection between one terminal and the isolated electrode areas.

In a preferred embodiment, a continuous electrode and its terminal are disposed on and insulative substrate and covered with an overlying thin film of dielectric material. Another terminal and a discontinuous electrode, comprising a plurality of conductive elements or islands, are provided in a coplanar arrangement on the upper surface of the dielectric material with the island electrode overlying the lower electrode and forming a capacitance in cooperation therewith. Change in circuit capacitance is obtained by making substantially ohmic contact between an incrementally increasing or decreasing number of the conductive islands and the adjacent terminal.

This ohmic contact is made, in the preferred embodiment by a rotatable resiliently mounted fine mesh wire gauze which provides, during rotation, a continuous intimate contact between all underlying islands and the adjacent terminal. This arrangement provides a capacitor which, by eliminating the interface gap and by use of high K dielectric films of very few (< 10 mils) mils thickness, increases maximum stable capacitance by several orders of magnitude over conventional variable capacitors.

In one particular embodiment illustrated herein, the island electrode is shown as a pattern of square islands placed on the dielectric surface. The islands are interconnected in parallel to their terminal by a rotatable contact member, and their arrangement is designed so that the rotating wiper makes incremental ohmic contact with as small a number of islands as possible during its advance. In another embodiment, the island electrode is formed in several zones, each having a different island geometry. It is also possible to form a multiplicity of microscopic islands by depositing a noncontinuous conductive film on the dielectric surface.

BRIEF DESCRIPTION OF THE DRAWINGS

FIG. 1 is a plan view of the stator of the preferred embodiment of the present invention showing the island electrode pattern and its terminal on an upper surface;

FIG. 2 is a cross-sectional view of the stator taken along line 2-2 of FIG. 1;

FIG. 3 is a plan view of the rotor utilized in the preferred embodiment;

FIG. 4 is a cross-sectional view of the rotor taken along line 4-4;

FIG. 5 shows the assembled capacitor provided in accordance with a preferred embodiment of the present invention;

FIG. 6 is a plan view of an island electrode illustrating another island pattern; and FIG. 7 is a view in section of an alternate stator structure wherein each outer major surface has an island electrode thereon.

DESCRIPTION OF THE PREFERRED EMBODIMENTS

FIGS. 1 and 2 illustrate a stator member 11 wherein a thin (0.2 mil) film electrode 12 of conductive material, such as silver or the like, is deposited as a generally semicircular annular segment on a portion of a major surface of insulating substrate 13. Substrate 13, which operates as the support layer of the laminated stator, has an aperture 14 therethrough, substantially located at the center or radius of conductive pattern 12. Substrate 13 is of sufficient rigidity and thickness, for example, 0.030 inch in the preferred embodiment, to fixedly support the overlying layers. A terminal 15, which is formed with and of the same material as electrode 12, extends from the circumference of electrode 12 to provide a terminal pad to which a circuit lead can later be soldered.

FIG. 2 shows a layer 16 of a ceramic dielectric deposited over the surface of film 12 and surrounding portions of substrate 13; the thickness of layer 16 overlying film 12 being approximately 1 mil. For the present embodiment, aluminum oxide has been used for the supporting substrate and a barium titanate glass mixture having a dielectric constant of approximately 400 for dielectric layer 16. For example, the barium titanate mixture as described in U.S. Pat. application No. 767,046 filed by Galeb A. Maher on Sept. 26, 1968 is suitable. A thin film (0.7 mil thick) of conductive material such as silver or the like, is then deposited over the outer surface of layer 16 in an electrode pattern 17, having islands 18, and a connective portion which includes contact area 19 and input terminal 20. Pattern 17 is disposed over and cooperates with the underlying continuous electrode 12 to form a capacitance.

Various methods of deposition for formation of the continuous and the island films can be used, such as spraying, sputtering, dipping, vacuum deposition and silk screening. Of course, the isolated electrode areas can be formed during film deposition or may be formed from a completed continuous film by photolithographic etching techniques or the like. Some of the appropriate materials for these conductive films are tantalum, gold, silver, platinum, rhodium, iridium, copper, molybdenum, or combinations thereof.

FIGS. 3 and 4 illustrate rotor member 23 of the present invention having a central aperture 24 therethrough. Member 23 comprises a flat washer 25 to which is affixed a resilient pressure pad or washer 26 for example, of silicon rubber or the like is preferable, since it resists pressure set. A conductive wiper 27 of wire mesh gauze is attached to one-half of the outer surface of washer 26 while an insulating skid plate 28 is affixed to the other half. The gauze can be 250 mesh square weave or finer and may be of brass, phosphorous bronze, stainless steel or other conductive material. Acceptable materials for skid plate 28 are Teflon or other films exhibiting a low coefficient of friction. For example, nylon or polyethylene film are also suitable for this purpose.

A completely assembled capacitor unit is shown in FIG. 5, wherein rotating member 23 is securely mounted on mating segment 31 of shaft 32. Rotor 23 is keyed to or affixed to shaft segment 31 by, for example, key slot 30. One end of shaft 32 passes through central aperture 24 of rotor 23 and also projects through aperture 14 of stator 11. Stator 11 and rotor 23 are installed so that their respective surfaces containing pattern 17 and wiper gauze 27 are in abutting relation. These abutting surfaces are biased into engagement by pressure spring 33 mounted on the end of shaft 32. The spring 33 acts against buffer element 34, which is a plastic washer or the like to force stator 11 and rotor 23 towards a shoulder 29 of shaft 32. Terminal leads 35 and 36 are connected to terminal areas 15 and 20 respectively.

Assuming a signal is present at terminal leads 35 and 36 to which a specified capacitance value is to be presented, and further assuming for purposes of the example that a clockwise rotation of shaft 32 (and rotor 23) is utilized, as wiper 27 and skid plate 28 begin to slide over the abutting face of stator member 11, wiper 27 engages islandic pattern 17 beginning at point 37 (FIG. 1) and provides a bridging connection to contact portion 19 (and terminal 20). As indicated, each island area 18 of electrode 17 acts with an opposing portion of electrode 12 (and dielectric 16 therebetween) to provide capacitance. Hence, as wiper 27 penetrates further into engagement with pattern 17, each island 18 is incrementally and electrically connected in parallel with precedingly contacted islands and contact area 19 to provide a capacitance at terminals 15, 20 in accordance with the area of the contacted islands. The rows of island areas forming pattern 17 are generally located obliquely to the leading edge 39 of wiper 27, that is, offset from the center of the annular segment so as to allow wiper 27 to contact an incrementally increasing number of islands 18 during rotation so as to assure the smoothest capacitance change.

The pressure exerted by spring 33 (between 10 and 100 p.s.i.) through pressure equalization pad 26 is sufficient to press wire gauze 27 uniformly and intimately against each conductive segment. Insulating skid plate 28, also mounted on washer 26, imparts a smooth rotation to the rotor member by moving over the stator surface with a minimum of friction.

Advantageously, the capacitor terminals are mounted directly on stator 11 which permits simplified external connection. Additionally, both island electrode 17 and its terminal contact area 19 are exposed on one side of the stator such that mechanical biasing of the rotor towards stator 11 simultaneously provides both electrode and terminal contact. For simplicity of construction electrode 17 and its terminal contact portion 19 should lie in substantially parallel planes, and preferably be substantially coplanar.

It is also preferable that complete annular stator and rotor surfaces be engaged. That is, electrode 17 and its contact terminal area 19 preferably form a full circle on which rides a full annular rotor, comprising substantially coplanar wiper 27 and skid 28. Of course, a complete annular ring may be provided in many ways, for example, electrode 17 and contact area 19 may be arranged so as to be contiguous along at least portions of their curved perimeters and a nonskid material be utilized to provide a complete stator annulus. In this case, wiper 27 would be increased along the radius (widened) to reach both the electrode and contact area.

As an added refinement, an insulative film 21 of low dielectric constant material, for example, a silicon varnish or a polyimide or the like may be deposited between islands 18 so as to provide enhanced operation. Film 21 is provided to a thickness equal to or slightly less than island height. Film 21 fills the separation between islands and serves further to stabilize the capacitor by reducing interisland capacitance which could cause undesirable capacitance variations with minor changes in rotor position or interface pressure. In this regard, film 21 not only prevents foreign material from filling the separation between islands, but also prevents any portion of wiper 27 from approaching the high dielectric material at the bottom of the separation. Hence, film 21 prevents wiper 27 from becoming part of or adding to the overall area of electrode 17 so that only the connection of particular capacitive portions to the circuit terminals is varied, and the actual capacitance of stator 11 never changes. Teflon or other low friction material can also be employed as film 21 so as to increase stability and reduce friction.

The wiper rotation can be stopped at any desired point up to its full capacitance position (when all areas of the islandic pattern 17 are engaged by wiper section 27) to establish a desired capacitance value. Inasmuch as contact 19 abuts the end of the annular segment making up electrode 17, and since the latter is of slightly shorter length than wiper 27, (see edge 37) electrical contact of wiper 27 is maintained with a diminishing portion of contact area 19 during rotation but even in full capacitance position, is still in electrical contact with at least a portion of this surface and maintains electrical continuity therewith. As rotation continues past the full capacitance position, or as rotation is reversed, the capacitance begins to decrease as island connection is reduced.

Wire gauze wiper 27, which is used to contact islands 18, provides uniform contact resistance, and eliminates undesirable effects such as noise and hysteresis of capacitance versus angular shift rotation. These defects, prevalent in the prior art, are reduced or eliminated by use of the mesh type gauze wiper which, when a capacitance position is established, "relaxes" and clings to the electrode segments establishing a uniform and intimate contact between all previously contacted segments. While the 400 mesh square weave of 0.7 mil wire proved to be optimum, other weaves such as twill and different size mesh may be used.

The mesh combines high conductivity, high flexibility, good wear resistance and an appropriate surface roughness to provide a novel long life sliding contact which is in essence a multiplicity of interconnected but substantially independent spring loaded (by rubber washer 26) contact areas having a few mils separation. It also includes a foraminous surface which provides multiple reservoirs or cavities for retaining undesirable materials automatically scoured from the electrode face during rotation. A foraminous metal film, a few tenths of a mil in thickness may be alternatively employed, however, this would not be as flexible or contribute the sinuous mesh surface.

As illustrated, rotor 23 is a laminated structure having its layers affixed to each other, however, in an alternative arrangement only wiper 27 and skid plate 28 are joined together and pad 26 is sandwiched between this assembly and washer 25 solely by mechanical bias applied in the completed capacitor unit. Where pad 26 provides a surface having high friction, for example, where it is of rubber material, mesh 27 will sufficiently track with pad 26 and washer 25, during rotation of the latter. However, to insure tracking, wiper 27 can also be keyed to or affixed to shaft 32 which drives washer 25, and indeed, all the separate elements making up the rotor can be so affixed to rotor shaft 32.

As an alternative wiper, which provided satisfactory results, a conductive rubber strip of metal loaded rubber was employed for contact wiper 27. This wiper configuration also has sufficient resiliency to make a highly uniform contact to selected islands. Additionally, it may be directly seated on flat washer 25 so to provide both conductive wiper 27 and rubber pressure washer 26.

For maximum efficiency the distribution of islands 18 should provide maximum effective use of the capacitance surface. Hence the geometry of each individual island segment is important. For example, assume that the outer diameter D of the stator annulus is 0.5 inch and the inner diameter $d$ (of aperture 14) is 0.05 inch, while each island segment 18 is a square having 0.008 inch sides, and a 0.002 inch space between islands. Then, the distance $b$ from one island edge to the next adjoining island edge will be 0.010 inch and the percentage effective area covered by the island segment is $$\frac{a^2}{b^2} \frac{(.008)^2}{(.01)^2} = .64 \text{ or } 64\%$$

The total area available for pattern distribution (assuming electrode 17 is a semicircle) is $$\frac{\frac{\pi D^2}{4} - \frac{\pi d^2}{4}}{2}$$

and the effective electrode area is then $$0.64 \frac{\frac{\pi D^2}{4} - \frac{\pi d^2}{4}}{2} = \frac{\frac{\pi .5^2}{4} - \frac{\pi .05^2}{4}}{2} = 0.062 \text{ inch}^2$$

Then in the given example, the maximum available capacitance in picofarads is $$C = \frac{.225 \, KA}{d}$$

Where A, the area of the electrode is 0.0625 in²; K is 400 and d, the distance between electrodes is 0.001 inch. Hence, C=5620 pf.

It is obvious that higher capacitances can be produced by using a dielectric layer 16 having a higher dielectric constant. For example, barium titanate having an excess of titanium provides a dielectric constant of 3000. This produces a capacitance of approximately 42,200 pf. in the above example.

Although the island pattern of the preferred embodiment comprises square segments, the invention is not limited to such a pattern. The island segments, may be rectangular, round, oval, etc. Moreover, the pattern need not be uniform throughout as evidenced in FIG. 6 which shows an alternate embodiment of pattern 17 of FIG. 1.

In FIG. 6, the substantially 180° of surface rotation available for pattern 17 is divided into four sectors or quadrant zones 17a through 17d, each of which has a different row orientation and islands of differing geometry. In this case, islands 18 increase in size in each succeeding quadrant. This arrangement affords a capacitance variation at different incremental rates depending upon the sector over which wiper 27 is advancing. For example, as wiper 27 advances into quadrant 17a (assuming a clockwise rotation), islands 18a into which zone 17a is subdivided, are relatively small and the incremental capacitance change is relatively small, and wiper 27 advances into quadrants 17b, c and d it begins to add (to the previously formed capacitance) the relatively larger island segments 18b, 18c and 18d. A typical distribution would be as follows:

quadrant 17a 43° arc and 56 percent effective area
quadrant 17b 50° arc and 66 percent effective area
quadrant 17c 45° arc and 76.5 percent effective area
quadrant 17d 42° arc and 80 percent effective area with the total effective electrode area amounting to 70 percent.

Special rates of capacitance variation with angular rotation (or sliding rate of wiper 27) may also be achieved by varying the geometry of electrode 12. Hence, instead of a regular annular segment as described, electrode 12 may vary in width etc. For example, the width of the semicircular strip that makes up electrode 12 may decrease from one end to the other so as to provide a particular capacitance curve (even with uniform islands 18) as wiper 27 progresses in this direction. It being understood of course, that capacitance variation achievable by variation in the overall geometry of pattern 17 would also be possible but would permit undesirable effects due to the wiper contact with the surface of dielectric film 16 in areas overlying electrode 12. Of course, this may be alleviated to some degree by providing film 21 in this area.

The unit can be constructed to provide more than one variable capacitance, for example by making lower electrode 12 in two segments (not shown) each in connection to a respective termination. In this case, the contact area for electrode 17 could be provided in a peripheral arrangement. Additionally, other variable components, such as resistors and inductors as well as fixed capacitors, resistors and inductors could be included, for example, the fixed element may be disposed between any terminal and its electrode.

Other embodiments of this invention consistent with the above described features may also be practiced. For example, the available capacitance may be increased by making use of both sides of stator 11 as shown in FIG. 7 wherein the cross-sectional structure shown in FIG. 2 is modified by depositing another continuous electrode 40 on the opposing surface of substrate 13, and thereafter, forming a second dielectric layer 41 over electrode 40. Then, another conductive film is formed on the outer dielectric surface with a portion overlying electrode 40 formed into electrode pattern 42, having a plurality of islands 43, while the remaining portion is formed into a second contact area 44 and an input terminal (not shown). Pattern 42 forms a fourth electrode and, with the underlying portion of third electrode 40, comprises a second variable capacitor. A second low dielectric film 45 may also be formed between islands 43. Assuming the same materials, surface areas and pattern geometry etc. of the first stator capacitor as described above, a second wiper identical to that previously described in FIGS. 3 and 4 will result in substantially the same capacitance as it opposite member as it advances across islandic pattern 42 in synchronism with the first wiper. If the capacitance of both capacitors are connected in parallel, the total available capacitance will thereby be doubled.

The two wipers can also be rotated in opposite directions or out of phase with each other, for example, the upper wiper may be mounted on shaft 32 so that it is keyed 180° from the lower wiper. In this case, and assuming each continuous electrode (electrodes 12 and 40) is connected to a different potential and both terminals of the islandic electrodes are commonly connected, the capacitor pair acts as a capacitance voltage divider. A signal potential can then be developed intermediate that on either electrode.

The voltage divider can more easily be constructed by two semicircular segments formed on substrate 13 in contact with respective terminals, and a discontinuous annular ring overlying both and adapted for rotor contact to a third terminal.

Advantageously, stator 11 provides a variable capacitor member in a laminated arrangement in which a support member provides a conductive electrode surface which carries a thin dielectric member and an overlying discontinuous electrode so as to provide exceptionally high capacitance with no interface gap. In the preferred embodiment, substrate 13 is of insulative material having a conductive film 12 and dielectric film 16 deposited on its overlying surface, however, other arrangements are possible. For example, electrode 12 and film 16 may consist of a thin tantalum sheet having an oxidized upper surface, or of reduced barium titanate having a thin oxidized surface.

In appropriate cases, the substrate itself may be of conductive or semiconductive material such as tantalum or reduced barium titanate. Of course, if the substrate body is to be of conductive material, contact area 19 and its terminal 20 have to be substantially isolated from the substrate by low dielectric constant material or the like in order to avoid their contribution of capacitance in this case.

I claim:
1. A high capacitance variable capacitor comprising a stator including an insulative substrate having a conductive surface portion providing a first electrode, a thin dielectric film overlying said first electrode, a discontinuous second electrode disposed on said film in overlying relation to said first electrode, said second electrode including a plurality of isolated conductive island areas, a first terminal and a second terminal respectively located adjacent said first electrode and said second electrode, said first terminal contacting said first electrode; and a rotor having a resilient conductive surface portion bridging between said second terminal and selected of said island areas for providing a capacitance between said first and second terminals in accordance with the rotation of said rotor into contact with an incrementally changing number of said island areas.

2. The capacitor of claim 1 wherein said second electrode and second terminal are substantially coplanar members exposed on a surface of said film, and said conductive surface portion of said rotor is a substantially planar member adapted to slidably engage said second terminal and said second electrode thereby bridging between said second terminal and said selected island areas.

3. The capacitor of claim 2 wherein said slidable contact member includes a resilient layer having a highly flexible conductive surface portion providing a multiplicity of interconnected contact areas providing substantially uniform contact pressure to adjacent island areas.

4. The capacitor of claim 1 wherein separations between said island areas are substantially filled with solid dielectric material having a much lower dielectric constant than that of said dielectric film separating said electrodes.

5. The capacitor of claim 3 wherein said conductive surface portion of said rotor is a metal wire gauze.

6. The capacitor of claim 5 wherein said second electrode is an annular segment, and said conductive surface portion of said rotor is an annular segment of at least slightly greater length than said second electrode and is disposed at substantially the same radial spacing as said second electrode.

7. The capacitor of claim 5 wherein said rotor includes a low friction surface portion substantially coplanar with said conductive surface portion thereof.

8. The capacitor of claim 3 wherein said rotor includes a flexible foraminous conductive layer adapted to be urged into contact with said second terminal and said island areas.

9. The contact of claim 8 wherein said conductive layer is a wire gauze, and said rotor includes a resilient support layer for urging said wire gauze into contact with said second terminal and said island areas.

10. The contact of claim 9 including a member of low friction material disposed adjacent said wire gauze so as to provide extended surface area of said contact.